United States Patent
Dybing

(10) Patent No.: US 9,217,447 B2
(45) Date of Patent: Dec. 22, 2015

(54) HYDRAULIC SYSTEMS UTILIZING COMBINATION OPEN- AND CLOSED-LOOP PUMP SYSTEMS

(75) Inventor: Philip James Dybing, Lanesboro, MN (US)

(73) Assignee: EATON CORPORATION, Cleveland, OH (US)

( * ) Notice: Subject to any disclaimer, the term of this patent is extended or adjusted under 35 U.S.C. 154(b) by 763 days.

(21) Appl. No.: 13/538,082

(22) Filed: Jun. 29, 2012

(65) Prior Publication Data

US 2013/0000293 A1   Jan. 3, 2013

Related U.S. Application Data

(60) Provisional application No. 61/503,761, filed on Jul. 1, 2011.

(51) Int. Cl.
*F16D 31/02*   (2006.01)
*F15B 11/17*   (2006.01)
(Continued)

(52) U.S. Cl.
CPC ............ *F15B 11/17* (2013.01); *F16H 61/4139* (2013.01); *F16H 61/4148* (2013.01); *F16H 61/44* (2013.01); *F16H 61/444* (2013.01); *F16H 61/47* (2013.01); *B28C 5/4213* (2013.01); *F15B 2211/20546* (2013.01); (Continued)

(58) Field of Classification Search
CPC ............ F16H 61/4139; F16H 61/4148; F16H 61/421; F16H 61/438; F16H 61/444; F16H 61/452; F16H 61/47

USPC ............................................ 60/427, 429, 488
See application file for complete search history.

(56) References Cited

U.S. PATENT DOCUMENTS 2,979,908 A  4/1961 Shook
3,443,380 A  5/1969 Karazija
(Continued)

FOREIGN PATENT DOCUMENTS

CN   1356223 A   7/2002
DE   10354022 A1  6/2004
(Continued)

OTHER PUBLICATIONS

International Search Report and Written Opinion for Application No. PCT/US2012/044888 mailed Jan. 7, 2013.
(Continued)

*Primary Examiner* — Michael Leslie
(74) *Attorney, Agent, or Firm* — Merchant & Gould P.C.

(57) ABSTRACT

A pump system includes a closed-loop fluid circuit and an open-loop fluid circuit. The closed-loop fluid circuit includes a motor for rotating a first component connected to the closed-loop fluid circuit. A closed-loop pump drives the motor up to a first maximum rotational speed. The open-loop fluid circuit includes an open-loop pump for driving a second component connected to the open-loop fluid circuit. A control circuit includes a control valve for switching the outflow from the open-loop pump. The control valve selectively connects the open-loop pump to the closed-loop fluid circuit and simultaneously disconnects the open-loop pump from the open-loop fluid circuit. When the open-loop pump is connected to the closed-loop circuit, the closed-loop pump and the open-loop pump drive the motor at a second rotational speed greater than the first maximum rotational speed.

20 Claims, 9 Drawing Sheets

(51) Int. Cl.
*F16H 61/4139* (2010.01)
*F16H 61/47* (2010.01)
*F16H 61/444* (2010.01)
*F16H 61/44* (2006.01)
*F16H 61/4148* (2010.01)
*B28C 5/42* (2006.01)

(52) U.S. Cl.
CPC ............... *F15B 2211/20561* (2013.01); *F15B 2211/20576* (2013.01); *F15B 2211/27* (2013.01); *F15B 2211/30595* (2013.01); *F15B 2211/7058* (2013.01); *F15B 2211/7142* (2013.01)

(56) References Cited

U.S. PATENT DOCUMENTS

| | | | |
|---|---|---|---|
| 3,900,075 A | 8/1975 | Chichester et al. | |
| 3,962,954 A | 6/1976 | Jacob et al. | |
| 4,044,786 A | 8/1977 | Yip | |
| 4,141,280 A | 2/1979 | Lorimor et al. | |
| 4,210,061 A | 7/1980 | Bianchetta | |
| 4,340,086 A | 7/1982 | Hemm et al. | |
| 4,383,412 A | 5/1983 | Presley | |
| 4,395,878 A * | 8/1983 | Morita et al. | 60/427 |
| 4,537,029 A | 8/1985 | Gunda et al. | |
| 4,759,183 A | 7/1988 | Kreth et al. | |
| 4,811,561 A | 3/1989 | Edwards et al. | |
| 4,986,072 A | 1/1991 | Kubomoto | |
| 5,148,676 A | 9/1992 | Moriya et al. | |
| 5,261,232 A | 11/1993 | Maffini et al. | |
| 5,615,553 A | 4/1997 | Lourigan et al. | |
| 5,673,558 A | 10/1997 | Sugiyama et al. | |
| 5,692,377 A | 12/1997 | Moriya et al. | |
| 5,826,676 A | 10/1998 | Ko | |
| 5,852,934 A | 12/1998 | Chung et al. | |
| 5,946,910 A | 9/1999 | Hayashi et al. | |
| 6,145,287 A | 11/2000 | Rosskopf | |
| 7,162,869 B2 | 1/2007 | Yoshino | |
| 7,331,175 B2 | 2/2008 | VerKuilen et al. | |
| 7,412,315 B2 | 8/2008 | Wildey et al. | |
| 7,604,300 B2 | 10/2009 | Whitfield, Jr. et al. | |
| 7,832,208 B2 | 11/2010 | Peterson et al. | |
| 7,849,689 B2 * | 12/2010 | Sakakura et al. | 60/427 |
| 2008/0296083 A1 | 12/2008 | Krieger | |
| 2009/0056324 A1 | 3/2009 | Itakura et al. | |
| 2009/0282824 A1 | 11/2009 | Ando et al. | |
| 2011/0283691 A1 | 11/2011 | Dybing | |

FOREIGN PATENT DOCUMENTS

| | | |
|---|---|---|
| EP | 2 261 427 A1 | 12/2010 |
| FR | 2010953 A1 | 2/1970 |
| FR | 2659699 A1 | 9/1991 |
| GB | 2339033 A | 1/2000 |
| JP | 2003-246239 | 9/2003 |
| JP | 2007-276418 | 10/2007 |
| JP | 2007-278430 | 10/2007 |
| WO | WO 2005/024246 A1 | 3/2005 |

OTHER PUBLICATIONS

International Search Report and Written Opinion dated Aug. 29, 2011 cited in Application No. PCT/US2011/033549; 11 pgs.

Office Action dated Jun. 18, 2014 cited in U.S. Appl. No. 13/095,613; 13 pages.

Final Office Action dated Jan. 2, 2015 cited in U.S. Appl. No. 13/095,613; 26 pages.

Chinese First Office Action for Application No. 201280032979.X mailed Jun. 3, 2015, with English Translation, 13 pages.

European Search Report for Application No. 12807645.2 mailed Jun. 5, 2015.

* cited by examiner

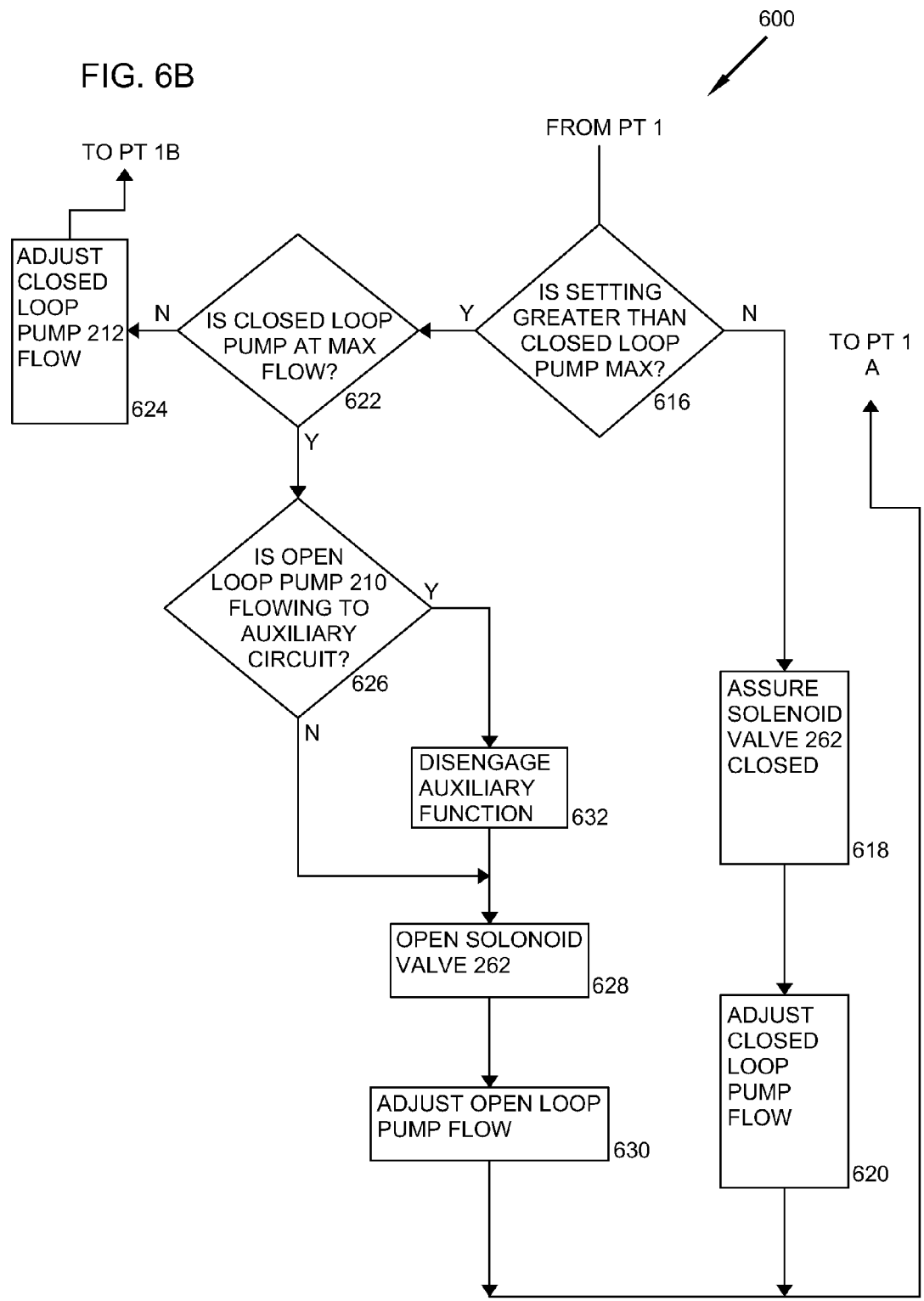

HYDRAULIC SYSTEMS UTILIZING COMBINATION OPEN- AND CLOSED-LOOP PUMP SYSTEMS

CROSS-REFERENCE TO RELATED APPLICATIONS

This application claims priority to and the benefit of U.S. Provisional Patent Application Ser. No. 61/503,761, filed Jul. 1, 2011, entitled "Transit Mixer with Combination Open- and Closed-Loop Pump System," the disclosure of which is hereby incorporated by reference herein in its entirety.

INTRODUCTION

Many vehicle and equipment hydraulic systems use a closed loop to drive a hydraulic motor and an open loop pump to drive hydraulic motors and cylinders. The closed loop pump and motor system may be used to operate a transit mixer drum, drive wheel motors in a gearbox to propel a vehicle, or drive a motor to operate an auxiliary function such as a platform, a head, a conveyor, etc. The closed loop fluid circuit and the open loop fluid circuit usually operate independent of each circuit.

In one particular example, transit mixers, also known as concrete or cement trucks, are used to move, mix, and pour large quantities of concrete at construction sites. Typically, the hydraulic system to rotate the mixing drum and control the auxiliary equipment includes the two separate fluid circuits described briefly above. The first fluid circuit includes a pump that can rotate the drum at low speed and high speed. Low speed rotation is used to prevent the concrete from hardening once mixed, typically during transit. High speed rotation is used when mixing the concrete or when cleaning out the drum. In that regard, a large pump is typically required to rotate the mixer even though its full capacity is rarely utilized. The second fluid circuit uses a smaller pump (as compared to the first pump) for driving auxiliary equipment on the transit mixer, for example, the tag axle, chute lift, etc. This pump is typically only used at the construction site for delivering the mixed concrete.

SUMMARY

In one aspect, the technology relates to a pump system including: a closed-loop fluid circuit including: a motor for rotating a first component connected to the closed-loop fluid circuit; and a closed-loop pump for driving the motor at a first maximum rotational speed; an open-loop fluid circuit including an open-loop pump for driving a second component connected to the open-loop fluid circuit; and a control circuit including: a control valve for selectively connecting the open-loop pump to the closed-loop fluid circuit while simultaneously disconnecting the open-loop pump from the open-loop fluid circuit, wherein when the open-loop pump is connected to the closed-loop circuit, the closed-loop pump and the open-loop pump drive the motor at a second maximum rotational speed greater than the first maximum rotational speed. In an embodiment, the closed-loop fluid circuit further includes a control spool for controlling a direction of rotation of the closed-loop pump, such that when the control spool is in a first position, an output flow from the closed-loop pump is directed in a first direction through the closed-loop circuit. In another embodiment, the control circuit further includes a shuttle valve system for controlling an output flow from the open-loop pump, such that when the open-loop pump is connected to the closed-loop circuit and when the shuttle valve system is in a first position, the output flow from the open-loop pump is directed in the first direction through the closed-loop circuit. In yet another embodiment, the pump system further includes a charge pump for filling each of the closed-loop fluid circuit and the open-loop fluid circuit with a hydraulic fluid. In still another embodiment, the pump system further includes a common motor for driving each of the open-loop pump, the closed-loop pump, and the charge pump.

In another embodiment of the above aspect, the shuttle valve system includes a shuttle valve. In another embodiment, the shuttle valve system includes at least one of a plurality of hydraulic piloted valves and a plurality of electronic solenoid operated valves. In certain embodiments, each of the closed-loop pump and the open-loop pump are variable displacement pumps. In other embodiments, a controller is connected to each of the closed-loop variable displacement pump, the open-loop variable displacement pump, the motor, and the control valve. In yet another embodiment, the controller sends a control signal to actuate the control valve so as to connect the open-loop variable displacement pump to the closed-loop fluid circuit when the controller receives a first component speed signal corresponding to a desired first component speed that is in excess of a first component speed produced when the closed-loop variable displacement pump is at the first maximum rotational speed. In still another embodiment, the control valve is a manual valve.

In another aspect, the technology relates to a transit mixer including the pump system described above, wherein the first component is a drum.

In another aspect, the technology relates to a method of controlling a pump system having a closed-loop fluid circuit including a closed-loop variable displacement pump, an open-loop fluid circuit including an open-loop variable displacement pump, a control valve, and a controller, the method including: adjusting an output flow of the closed-loop variable displacement pump based on a first desired speed signal received by the controller; and actuating the control valve so as to connect the open-loop variable displacement pump to the closed-loop fluid circuit based on a second desired speed signal received by the controller. In an embodiment, the method includes increasing an output flow of the open-loop variable speed pump based on a third speed signal received by the controller. In another embodiment, the method includes reducing the output flow of the open-loop variable displacement pump based on a fourth desired speed signal received by the controller. In an embodiment, the method includes changing an output flow direction from the closed-loop variable displacement pump based on a desired direction signal received by the controller. In yet another embodiment, the method includes changing a position of a shuttle valve at an outlet of the open-loop variable displacement pump based on the desired direction signal received by the controller. In still another embodiment, the method includes disengaging an auxiliary function of the open-loop fluid circuit, prior to actuating the control valve. In another embodiment, the method includes charging each of the open-loop fluid circuit and the closed-loop fluid circuit with hydraulic fluid.

BRIEF DESCRIPTION OF THE DRAWINGS

There are shown in the drawings, embodiments which are presently preferred, it being understood, however, that the technology is not limited to the precise arrangements and instrumentalities shown.

FIGS. 6A and 6B depict a method of controlling a combination open-loop and closed-loop pump system for a transit mixer.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure. In the present application, a combination open- and closed-loop hydraulic system is often described in the context of a transit mixer. The combination systems disclosed herein, however, may be used in a wide variety of vehicles, such as crop sprayers, skid steer loaders, windrowers, and combine harvesters, as well as other types of industrial equipment, such as mixers, batchers, conveyors and other single purpose rotary actuator applications. Other applications of the systems disclosed herein are contemplated and will be apparent to a person of ordinary skill in the art.

Figure 1:
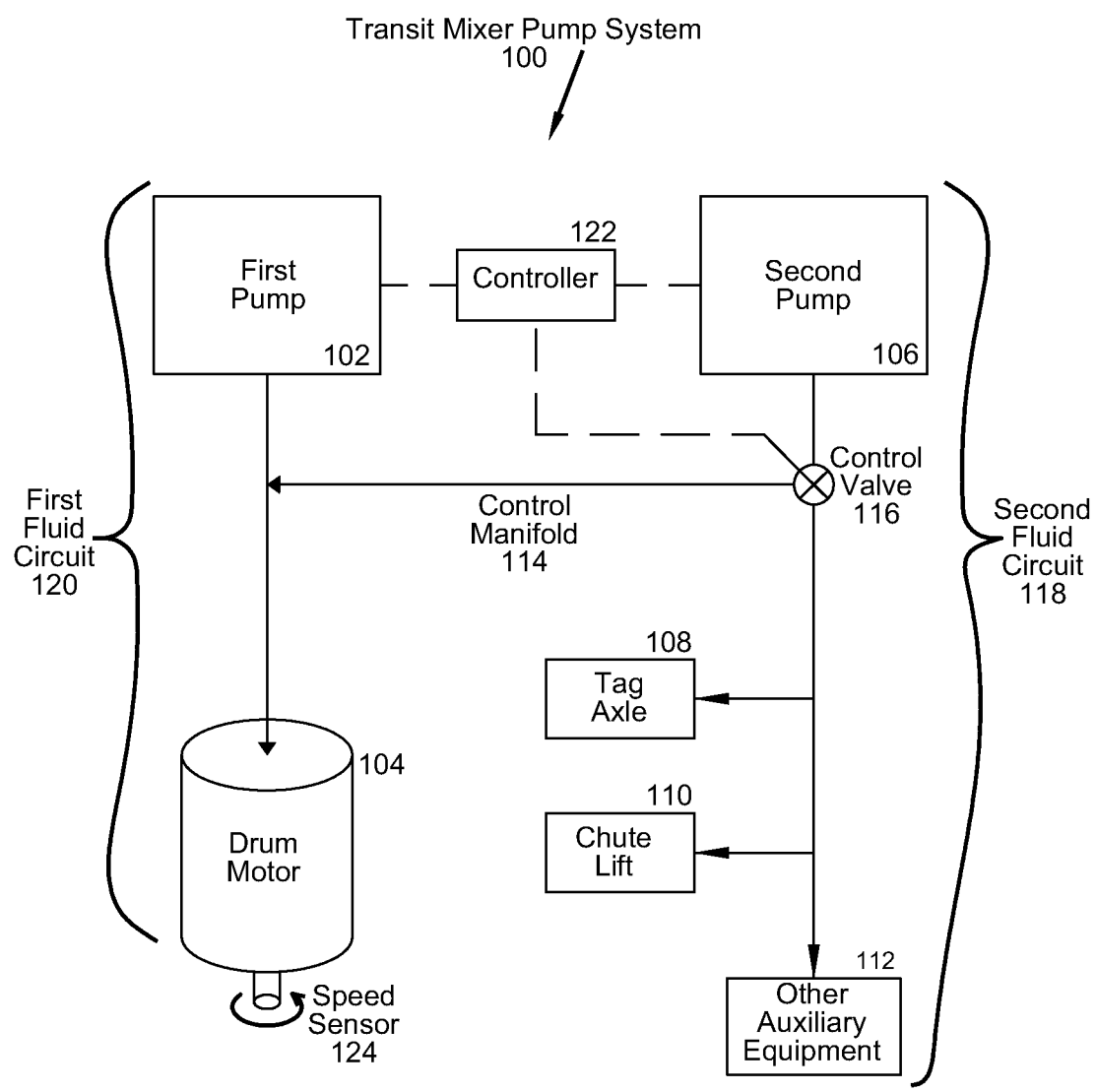
FIG. 1 is a schematic diagram of a pump system for a transit mixer.

FIG. 1 depicts a schematic diagram of a pump system for a transit mixer 100. The pump system 100 includes a first pump 102 that drives the drum motor 104 that in turn rotates the drum. A second pump 106 drives one or more auxiliary components or equipment, for example, a vehicle tag axle 108, a cement chute lift or positioning apparatus 110, or other auxiliary components 112. A control manifold 114 and control valve 116 allow selective disconnection of the second pump 106 from the second fluid circuit 118 and, therefore, selective connection of the second pump 106 to the first fluid circuit 120. In the depicted embodiment, the first fluid circuit 120 is a closed-loop circuit, and the second fluid circuit 118 is an open-loop circuit. In alternative embodiments, however, both circuits may be closed-loop circuits. Since the drum must operate in reverse to discharge its contents during pouring, an open-loop circuit for the first fluid loop is typically not desirable. The control valve 116 and the control manifold 114 allow for selective connection and isolation of the second pump 106 to the two circuits. The control valve 116 may be manually operated or may be actuated by an electronic controller 122, as depicted. By combining the output of the second pump 106 with the first fluid circuit 120, drum motor speed may be increased. A speed sensor 124 on the drum motor, along with command input speed, causes the control valve 116 to actuate, thus combining the second pump 106 with the first fluid circuit 120, as required or desired. If high speed rotation is required, for example, when mixing concrete or cleaning out the drum, the output of the second pump 106 may be diverted to the first fluid circuit 120 so as to allow the increased rotational speed of the drum motor.

When use of an auxiliary function is required or desired, the control valve 116 actuates again, thus directing flow to the auxiliary component requiring flow. When the second pump 106 is isolated from the first fluid circuit 120, the drum motor rotates at a lower speed, helping to ensure concrete held in the drum does not harden. As described above, typical auxiliary functions are chute control (lift, rotate, fold, etc.), as well as tag axle pressure control, but other functions may be incorporated.

Figure 2:
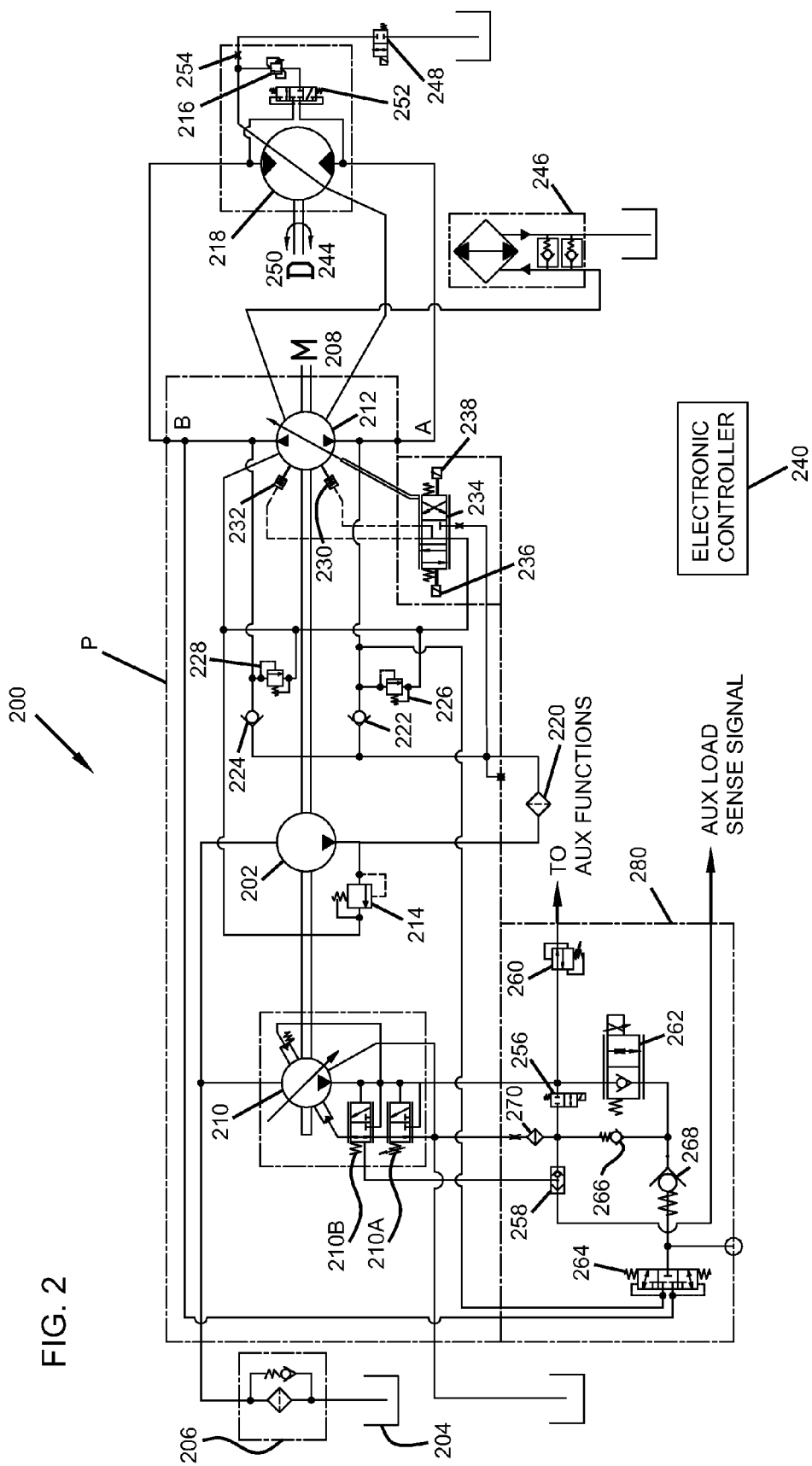
FIG. 2 is a schematic diagram of a combination open-loop and closed-loop pump system for a transit mixer.

FIG. 2 depicts a schematic diagram of a combination open-loop and closed-loop pump system 200 for a transit mixer. The pump system 200 depicted in FIG. 2 includes an open-loop charge circuit, a variable displacement closed-loop pump system to drive the drum motor, and a variable displacement open-loop pump system to drive the auxiliary components of the transit mixer. A control circuit 280 includes a number of components used to connect and disconnect the open- and closed-loop circuits.

The charge circuit includes provide a charge pump 202 to charge and control pressure for the closed-loop hydrostatic drive circuit depicted, in part, by side A and side B. The charge pump 202 draws hydraulic fluid from a unit reservoir 204, via a main suction line. A suction screen or filter 206 prevents debris from the reservoir 204 from being drawn into the system. The charge pump 202 is driven by a power source or motor 208, typically an internal combustion engine or an electric motor. In the depicted system, a common motor 208 provides power via a through-drive to all of the charge pump 202, an open-loop pump 210, and a closed-loop pump 212. In such an embodiment, the charge pump 202 may be integrated into a single assembly with pump 212 and pump 210. In other embodiments, a dedicated motor may be used for the charge pump 202. The displacement of the charge pump 202 may be determined by the specific application requirements or otherwise as desired. In a commercial embodiment however, a pump having a flow rate of about 8 gal/min to about 12 gal/min at high idle engine RPM may be utilized, though other capacities are contemplated.

A charge relief valve 214 controls a charge pressure setting in the closed-loop circuit that includes the pump 212 and associated control requirements. In addition, this relief valve 214 will be balanced with a low pressure relief valve 216 to provide proper oil flow through the pump case of pump 212 and motor case of motor 218. The outlet of the charge pump 202 flows through a charge pressure filter 220 to clean the oil that enters the low pressure side of the hydrostatic drive circuit and that enters the control valve that sets pump displacement (the control spool 234 and solenoids 236, 238, as described in more detail below). After filtration, the hydraulic fluid enters the closed fluid circuit on the low pressure side. In the depicted embodiment, the low pressure side of the closed fluid circuit is indicated by A. A check valve 222 allows charge pressure to enter the low pressure side of the circuit. The low pressure side is the return side, proximate the inlet of the pump 212. A check valve 224 prevents flow from the high pressure side of the closed fluid circuit. If the direction of motor rotation is reserved, side B becomes the low pressure, return side. In this configuration, hydraulic fluid enters the closed circuit via the check valve 222, while the check valve 224 prevents from of fluid out of the high pressure supply side. Located between check valves 222, 224 and the pump 212 are a power limiting valves 226, 228. These are typically set at the maximum allowable pressure in the closed-fluid circuit. In certain embodiments, the valves 226 and 228 actuate at about 5000 to about 6000 PSI. At this pressure, the flow through the power limiting valves 226, 228 will reduce the charge pressure in the closed fluid circuit to a point where the pump 212 will destroke due to the springs in pistons 230 or 232, thus overcoming the reduced charge pressure and forcing the swash plate towards neutral. The swash plate pivot angle is in direct relationship to the outlet flow as it affects the total inward and outward movement of the pump pistons. When the swash plate pivots to the neutral position, there is no inward or outward motion of the pump pistons, so the flow decreases to zero output. The swash plate can be controlled to go over the neutral position whereas the output flow is directed out of the second port, causing the driven motor to go in a reverse direction.

The charge pump 202 also delivers hydraulic fluid to a control spool 234 that is used to port oil to servo pistons 230 or 232 as required to set the flow rate and direction of the closed-loop pump 212. The control spool 234 includes two control solenoids 236, 238 that are controlled by an electronic controller 240. Each solenoid 236, 238 may move the control spool 234, thereby causing the charge pressure to be open to one of the two servo pistons 230, 232, thus causing the pump 212 to stroke in the desired direction. The servo pistons 230, 232 also controls flow rate. The servo piston 230, when pressurized, moves a swash plate to drive fluid to the A side of the closed fluid loop. Similarly, the servo piston 232, when pressurized, moves the swash plate to drive fluid to the B side of the closed fluid loop, thus reserving direction of the pump 212 and, therefore, the motor 218. In another embodiment, a two-position three-way valve may be utilized to direct flow directly to one of the two servo pistons 230, 232. This configuration would eliminate the spool 234 and a feedback link 242, which is used to move the spool 234 in a manner similar to that of a servo control loop to maintain a set displacement as required by the controller 240. The set position is determined by the controller 240 based at least in part on the required speed of motor 218 as measured by a speed sensor 244.

Additionally, the charge pump 202 also delivers a flow of cooling hydraulic fluid to both closed-loop pump 212 and the hydrostatic motor 218 that drives the drum mixer. Cooling fluid from the closed-loop pump 212 passes through a hydraulic cooler 246 into a reservoir, which may be the unit reservoir 204. Cooling fluid passes through the case of the motor 218 and to a reservoir, which may also be the unit reservoir 204. Depending on specific application needs, an optional solenoid 248 may be utilized if further management of the charge flow is required. This will help ensure proper cooling and maximum pressure requirements through the cases of the motor 218 and the closed-loop pump 212. The solenoid 248 may be controlled by the electronic controller 240, depending on specific operating conditions.

The first fluid circuit, in this case, the closed-loop fluid circuit, includes a closed-loop variable displacement pump 212 that, in a first configuration, moves hydraulic fluid from side A (the low pressure or return side) to side B (the high pressure or supply side). As described above, the closed-loop pump 212 is driven by the motor 208 and its output flow may be reversed to rotate hydraulic motor 218 in either a forward or reverse direction as commanded by the controller. In certain commercial embodiments, the closed-loop pump 212 may produce maximum flow rates from about 30 gal/min to about 35 gal/min, though other pumps having other capacities are contemplated. The closed-loop pump 212 directly drives the hydrostatic motor 218 that may be either fixed or variable displacement. The size of the motor 218 may be determined on an application-specific basis.

A speed sensor 244 measures the rotational speed and direction of the motor output drive shaft 250. This measured speed is used as an input to the controller 240 that controls both pumps 212 and 210 to provide the proper flow rate to meet the desired rotational speed to rotate shaft 250. The shaft 250 may be a propel circuit, a transit mixer drum drive circuit, or generally any rotary driven application. A shuttle valve 252 allows excess charge (i.e., fluid) flow to exit the circuit via a charge relief valve 216. The shuttle valve 252 also allows excess charge to pass through the motor case, thereby cooling and lubricating the internal components of the motor 218. The charge relief valve 216 is balanced with the charge relief valve 214 to ensure proper flow through the casing of the motor 218.

A control orifice or pressure compensated flow regulator 254 may also be utilized, if required or desired, to allow part of the charge flow to bypass the case of the motor 218. It should be noted that the combining of flows from pump 210 and charge pump 202 results in much higher flow rates than typically encountered in a traditional closed-loop drive system. The flow out of the flow regulator 254 may be directed through the hydraulic cooler 246 or merely run directly to a reservoir, as depicted, depending on system sizing considerations. Alternatively, a dedicated cooler could be installed downstream of the flow regulator 254.

The open-fluid circuit is driven by the variable displacement pump 210, which draws hydraulic fluid from the unit reservoir 204. The open-circuit pump 210 may be, in one embodiment, a load sense pressure compensating variable displacement pump. The pump 210 includes both pressure limiting 210A and load sense 210B feedback controls as typical in any load sense circuit. The displacement of the pump 210 will be determined by the application needs, but in certain commercial embodiments, flow rates up to about 15 gal/min are contemplated. The pump 210 is driven by either the through drive from the motor 208 or by a dedicated motor. Output from the pump 210 flows to a proportional solenoid valve 262 that is controlled by controller 240. As described below, the controller 240 actuates the solenoid 262 so as to allow fluid flow from pump 210 into the closed-loop circuit, as required based in part by the required speed setting of the motor 218. When flow is required for a typical tag axle circuit, the controller 240 activates another solenoid valve 256 to cause the pump to go to a pressure limiting state. In other circuits, solenoid valve 256 may not be required and instead a traditional load sense signal can be fed via shuttle valve 258 to cause the pump to stroke to the required flow rate. Flow to the auxiliary circuit may pass through a pressure reducing valve 260, if required or desired, to protect auxiliary circuit components from excessive pressure.

When the solenoid 262 is positioned so as to provide flow from the open-circuit pump 210 to the closed fluid loop, the flow passes through a hydraulic shuttle valve 264 to direct flow from pump 210 into the high pressure side of the closed-loop. Other elements of the open fluid circuit include a check valve 266 that allows outlet pump pressure from the pump 210 to be directed back to the load sense feedback spool on the pump 210 and cause the pump 210 to increase flow rate. The position of the proportional solenoid valve 262 will create a pressure margin that the pump 210 will respond to, and generate the required flow rate needed to satisfy the required rotational speed of the motor 218. The proportional solenoid valve 262 is controlled by the electronic controller 240 to attain the desired output speed of motor 218. Furthermore, the check valve 266 will prevent any flow from the pump 210 from entering the closed loop system when the pump 210 is required to provide an auxiliary function and not combine with the flow from the closed loop pump 212. The check valve 268 prevents back flow from the closed-loop hydrostatic drive circuit when the flow from the pump 210 is not required in the closed fluid circuit. A shuttle valve 258 allows either a load sense signal to the pump 210 when combining with the closed-loop pump circuit or the load sense signal from the auxiliary circuit. An orifice and filter 270 drains the load sense signal when pump 210 has no flow requirements. This drain orifice 270 reduces the outlet pressure to the low pressure standby setting, reducing power loss when no functions are required of the pump 210.

Figure 3:
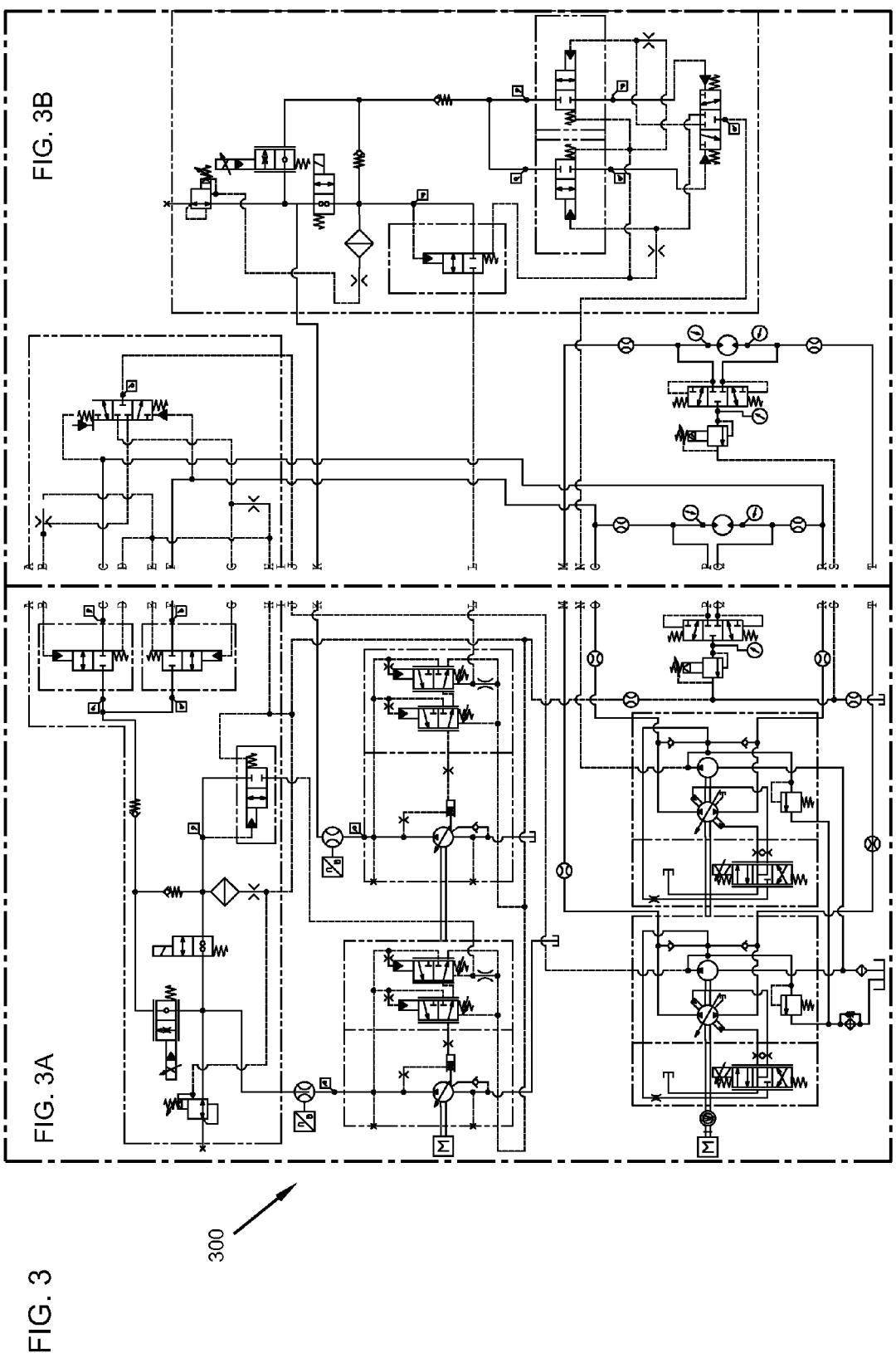
FIG. 3 is a schematic diagram of a combination open-loop and closed-loop pump system for a dual path propel system.
Figure 3A:
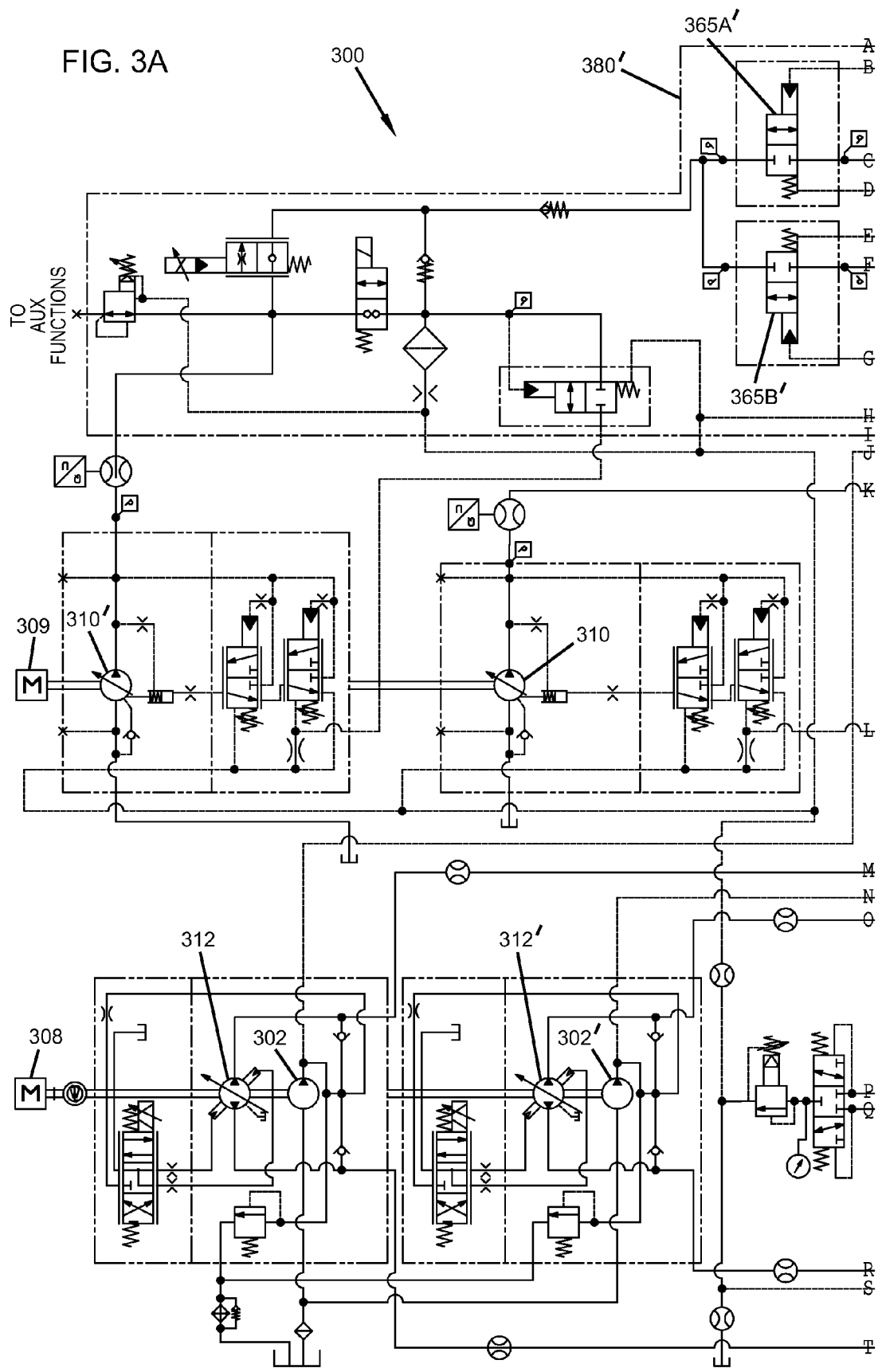
FIGS. 3A-3B are enlarged partial schematic diagrams of the system of FIG. 3.
Figure 3B:
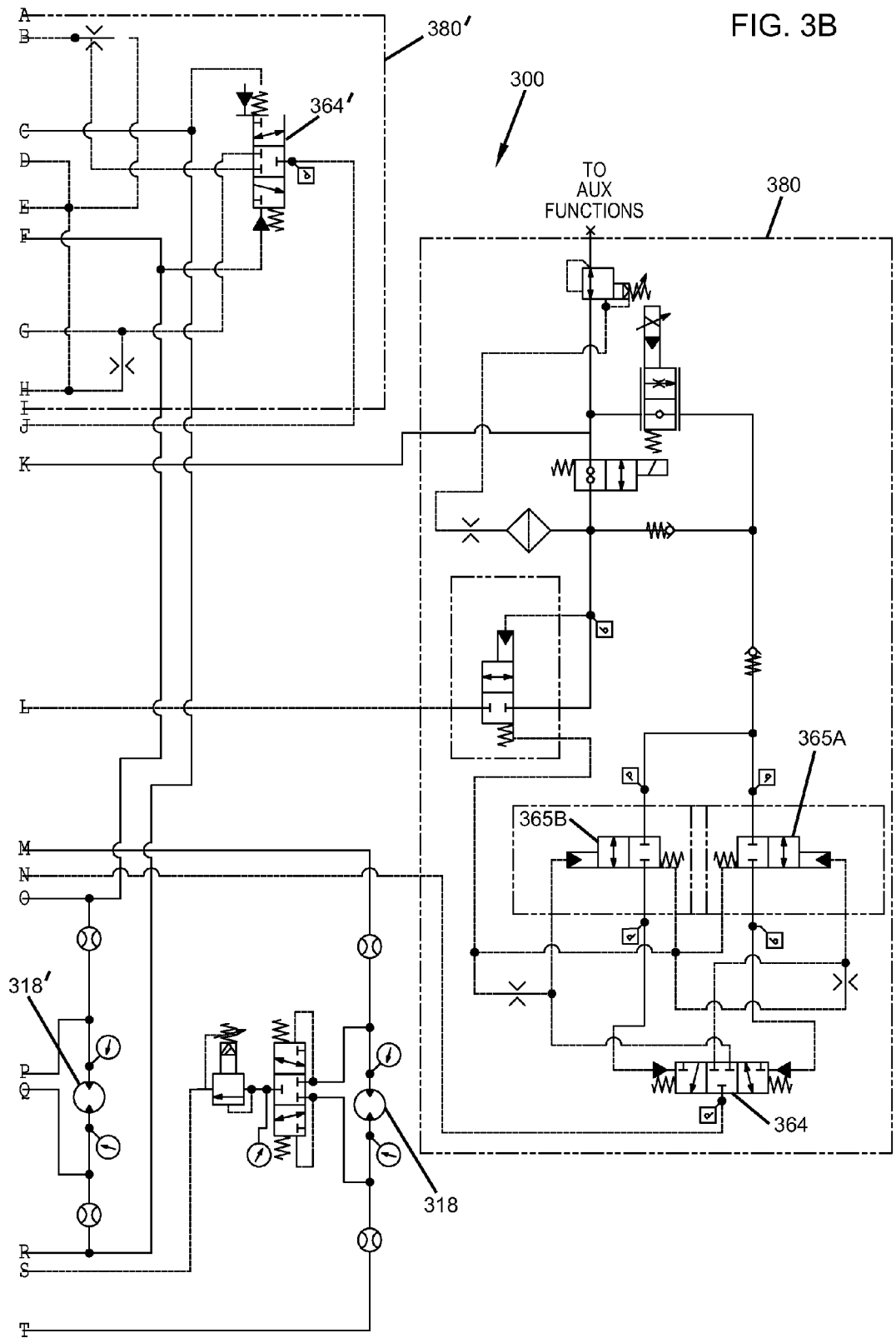

FIG. 3 is a schematic diagram of a combination open-loop and closed-loop pump system for a dual path propel system 300. Partial enlarged schematic diagrams are depicted in FIGS. 3A and 3B. This dual path system 300 includes two combination open- and closed-loop circuits, each of which controls half of the propel function of a dual path machine, which may include self-propelled windrowers, self-propelled forage harvesters, and skid steer loaders. Such a system 300 may be used in any vehicle that utilizes a dual path propel drive hydraulic system. The components utilized in the various circuits are similar in layout and function to those depicted in the system 200 of FIG. 2, and accordingly, are not described in further detail herein. However, for clarity, a number of elements are identified below. The system 300 includes two closed-loop pumps 312, 312', one for each of the two closed-loop circuits. The closed-loop circuits also each include a motor 318, 318'. Drives associated with each of these motors 318, 318' are not depicted in FIG. 3 but would operate similar to the drive 250 depicted in FIG. 2 to provide power to the desired equipment. A charge pump 302, 302' is also included in each of the two closed-loop circuits. Each of the open-loop circuits includes an open-loop pump 310, 310'. A motor 308 drives both of the closed-loop pumps 312, 312' and both of the charge pumps 302, 302'. A separate motor 309 drives both of the open-loop pumps. Of course, a single motor may be used in place of motors 308, 309.

Control circuits 380, 380' allow for isolation and combination of the related open- and closed-loop circuits. The valve configurations in the depicted control circuits 380, 380' differ slightly from the embodiment in FIG. 2. Specifically, and with reference to control circuit 380, the hydraulic shuttle valve 264 (depicted in FIG. 2) is replaced with a valve system including a hydraulic shuttle valve 364 and two hydraulic piloted valves 365A, 365B. Together, these three valves 364, 365A, 365B perform the same function as valve 264. Of course, a single hydraulic control valve such as valve 264 depicted in FIG. 2 may alternatively be used. A similar valve 364', 365A', 365B' configuration is utilized in control circuit 380'. The common link between the two combination open- and closed-loop circuits is the ground.

Figure 4:
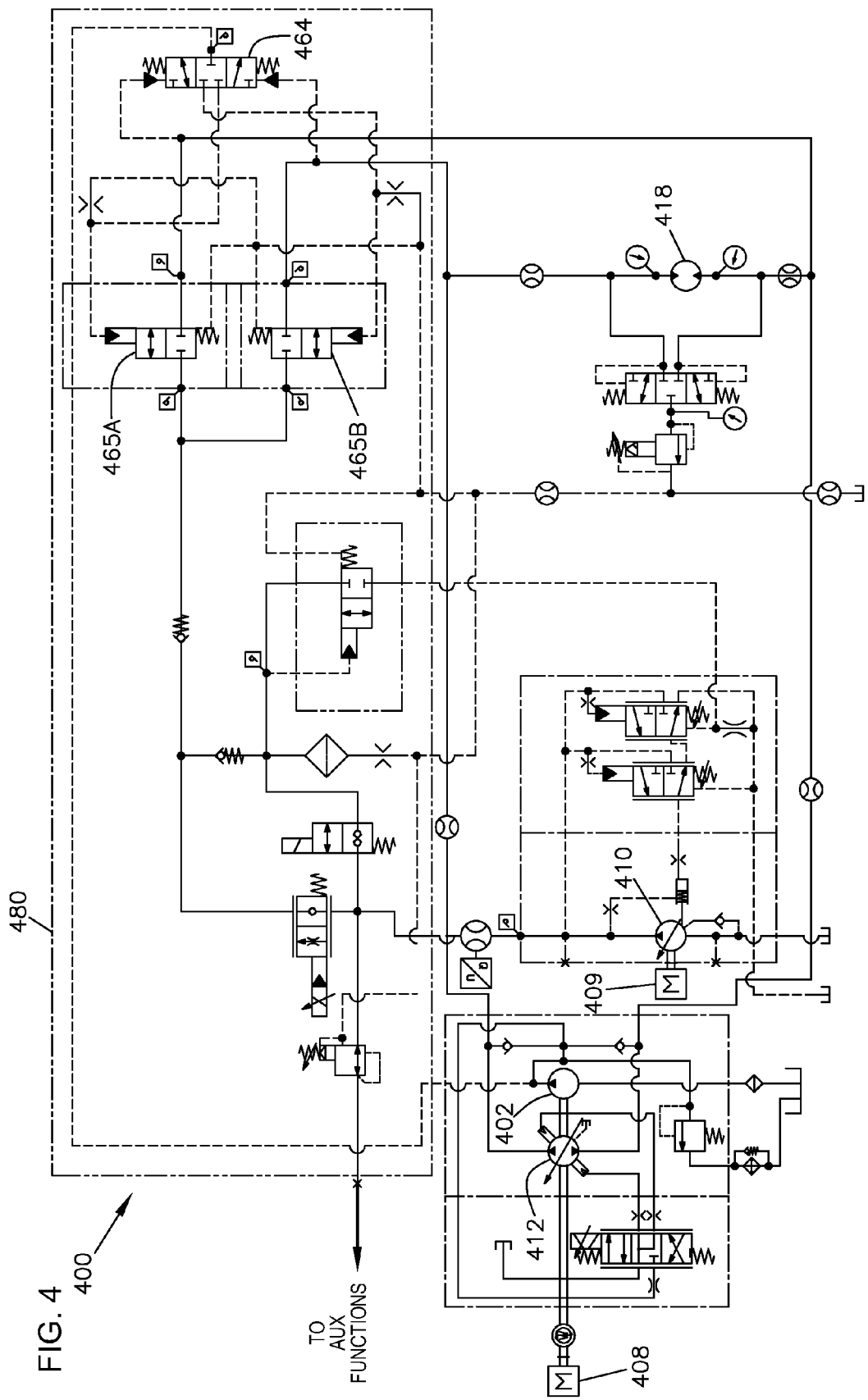
FIG. 4 is a schematic diagram of a combination open-loop and closed-loop pump system for a single path propel circuit.

FIG. 4 is a schematic diagram of a combination open-loop and closed-loop pump system for a single path propel circuit 400. Such a system 400 may be used with a single-purpose rotary actuator. Again, many of the components are described above with regard to the previous figures. For clarity, the depicted system 400 includes a closed-loop pump 412 and a charge pump 402, both driven by a motor 408. A separate motor 409 drives an open loop pump 410. A motor 418 may be powered by the closed-loop circuit, or the open- and closed-loop circuits, in combination. A control circuit 480 includes a hydraulic shuttle valve 464 and two hydraulic piloted valves 465A, 465B.

Figure 5:
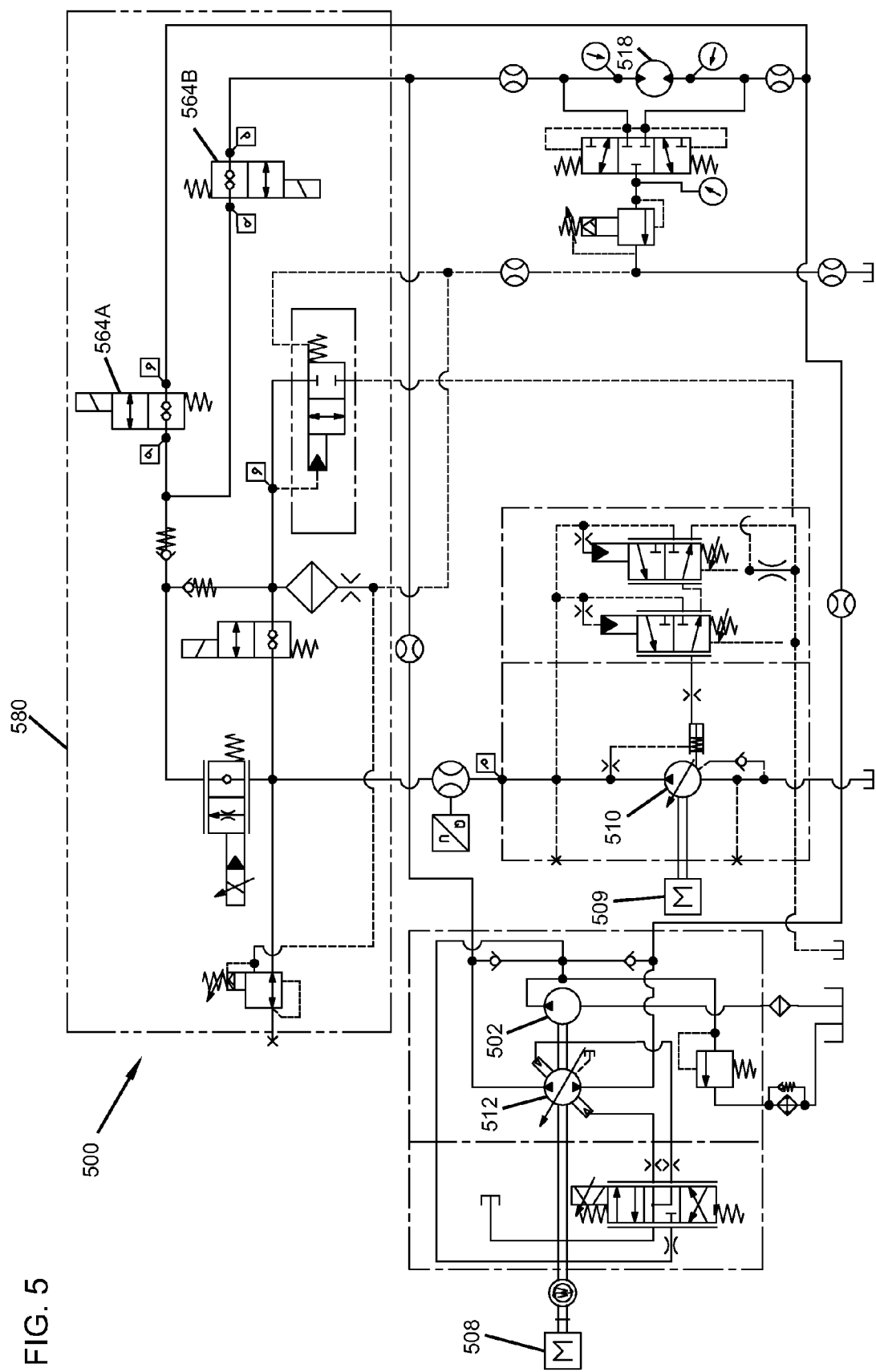
FIG. 5 is a schematic diagram of another embodiment of a combination open-loop and closed-loop pump system for a single path propel circuit.

FIG. 5 is a schematic diagram of another combination open-loop and closed-loop pump system for a single path propel circuit 500. Such a system 500 may be used with a single-purpose rotary actuator. Again, many of the components are described above with regard to the previous figures. The depicted system 500 includes a closed-loop pump 512 and a charge pump 502, both driven by a motor 508. A separate motor 509 drives an open loop pump 510. A motor 518 may be powered by the closed-loop circuit, or the open- and closed-loop circuits, in combination. A control circuit 580 differs from those described in FIGS. 2-4 above. Specifically, the control circuit 580 utilizes electric solenoid operated valves 564A, 564B to couple the open-loop pump 510 to the closed-loop circuit.

Figure 6A:
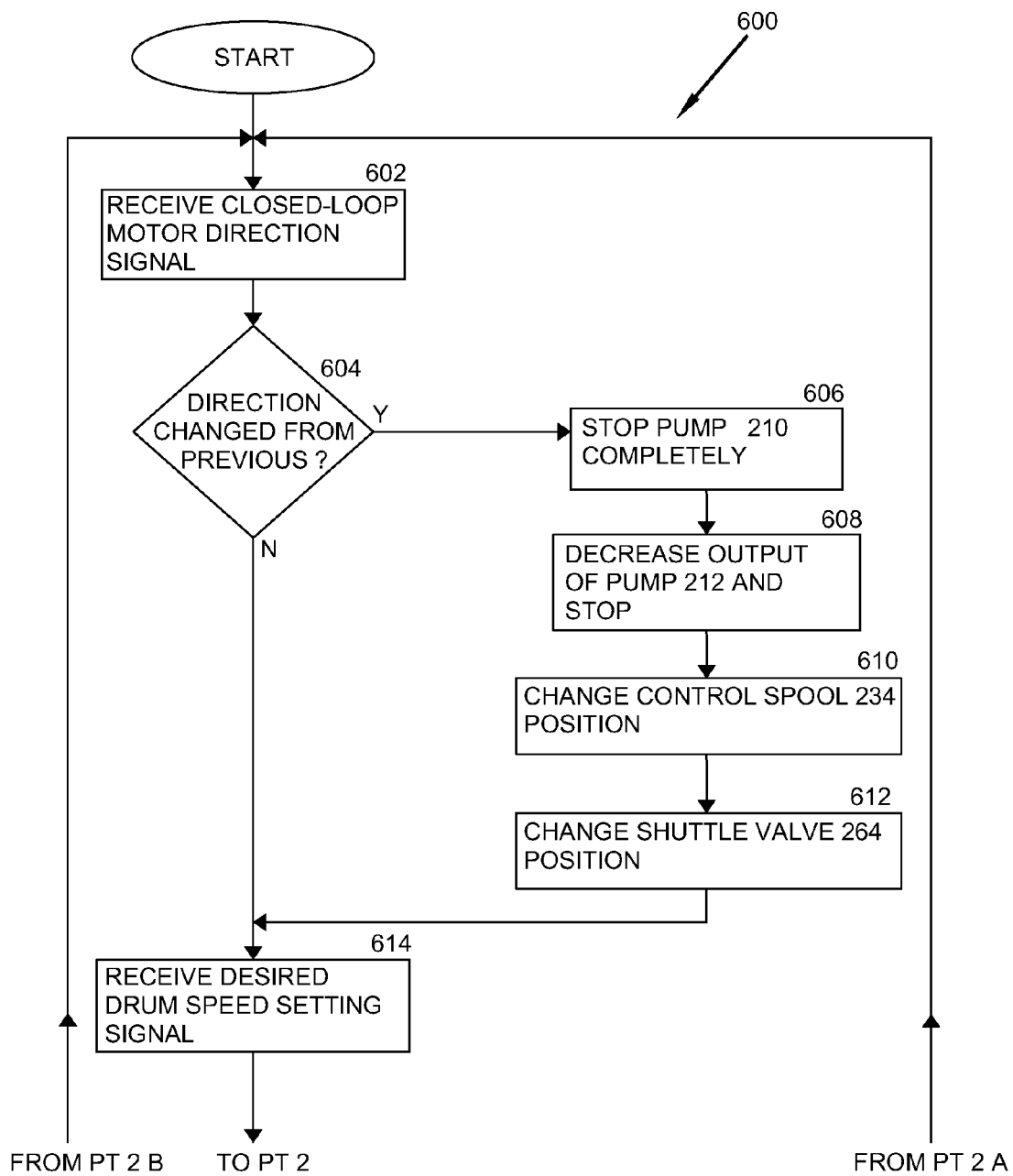

FIGS. 6A and 6B depict one method 600 of controlling a pump system for a transit mixer (such as the pump system 200 depicted in FIG. 2), as controlled by the electronic controller 240. Similar methods are contemplated to control the systems depicted in FIGS. 3-5 and would be apparent to a person of skill in the art. The method 600 begins with the controller receiving a signal indicating the desired motor 218 direction (operation 602). Certain functions are associated with certain required directions of rotation for the motor 218 and, therefore, the drum. For example, mix, clean, and transport functions typically require the drum to rotate in a first direction. A concrete discharge operation typically requires that the drum rotate in a second, opposite direction. In certain embodiments, certain modes (for example, mix) may automatically be programmed with a set speed, but the depicted method contemplates variable speed adjustment for all modes. If the operator-desired direction has changed from a previously-selected direction (operation 604) of the operating motor, any operating pumps must be slowed or stopped prior to changing flow direction. First, the output of the open-loop pump 210 should be reduced and stopped completely (operation 606), and then the closed-loop pump 212 should be decreased and then stopped (operation 608). Once operation of the pump 212 is sufficiently reduced, the position of the control spool 234 is changed (operation 610). The shuttle valve 264 also changes position (operation 612), typically in response to a change in pressure, but shuttle valves that require actuation based on a signal sent from the electronic controller 240 may also be used.

After the direction of flow through the circuit is set, a signal indicative of a drum speed setting is received by the electronic controller 240 (operation 614). Again, the drum speed setting may be associated with particular operational modes (e.g., mix), but manual operator control may be more desirable. If the speed setting is less than the maximum flow of the closed-loop pump 212 (operation 616), the algorithm next determines if the solenoid valve 262 is closed (operation 618), thus ensuring that the open-loop pump 210 is isolated from the closed-loop fluid circuit. Thereafter, the closed-loop pump 212 flow is adjusted until it meets the desired speed set point (operation 620). Thereafter, the algorithm waits for further adjustment of the speed setting. Alternatively or additionally, the algorithm may await further adjustment of the directional setting. Regardless, further adjustment of either the desired motor direction or the motor speed setting will return the algorithm to the appropriate position to continue control of the pump circuit.

Returning to the speed determination inquiry (operation 616), if the desired speed setting is not in excess of the maximum closed-loop pump 212 flow capability (operation 622), the displacement or flow of the closed-loop pump 212 is first adjusted to its maximum setting (operation 624). If the closed-loop pump 212 is at its maximum setting (operation 622), the algorithm next determines if flow from the open-loop pump 210 is flowing to the auxiliary or open-fluid circuit (operation 626). If apparently not, the algorithm first ensures that the solenoid valve 262 is open (operation 628) (thus ensuring connection between the open-loop pump 210 and the closed-fluid circuit), then adjusts the open-loop pump 210 output flow to meet the desired speed level (operation 630). This output flow control was previously described. If the open-loop pump 210 is delivering fluid to the auxiliary circuit (operation 626), the auxiliary fluid circuit is disconnected (operation 632) by either closing the solenoid valve 256 or controlling the auxiliary valve functions (not depicted in FIG. 2) to cease operation, prior to opening solenoid valve 262 (operation 628) and adjusting the open-loop pump 210 (operation 630). Upon adjustment, as above, the algorithm could wait until further speed or direction adjustment is made.

Other methods of controlling the pump system are contemplated. For example, the above-described method contemplates a two-position shuttle valve 264. In the system embodiment depicted in FIG. 2, the shuttle valve 264 includes three positions, one each to direct the output from to either the A side or the B side of the closed loop circuit, as well as a third, neutral position and is actuated automatically, due to circuit pressure. Valves that require actuation by the electronic controller may also be utilized. While the above-described method indicates that the shuttle valve 264 automatically moves to the appropriate position based on pressure, an alternative embodiment may include a shuttle valve that requires direct actuation and therefore, modification of the algorithm. Also, the closed-loop pump 212 may be a fixed displacement pump, while the open-loop pump 210 may be a variable displacement pump. Accordingly, variable speed adjustment would only be possible beyond the maximum output flow of the fixed displacement pump, which would require slightly different controls. Having two variable displacement pumps, however, allows for greater flexibility and control. For example, the displacement of both pumps may be individually adjusted as required. That is, instead of adjusting the displacement of the open-loop pump 210 once the closed-loop pump 212 has been set to maximum displacement, the displacement of the open-loop pump 210 may be maximized and the displacement of the closed-loop pump 212 may be adjusted as required. This may provide redundancy in the event of pump failure or if one pump is unable to reach maximum speed due to mechanical or electrical problems. Other modifications and control sequences are contemplated.

The pump system described above may be sold as a kit, either in a single package or in multiple packages. A kit may include a closed-loop pump, an open-loop pump, and a charge pump, along with the necessary or desired sensors and valves, electronic controller, etc. Alternatively, the pumps, through-drive, and power source therefore, may be sold as a single unit, along with the electronic controller. Users may then obtain the various valves and sensors separately from a third party or from the pump supplier. In another embodiment, the components bounded by line P (as depicted in FIG. 2) may be included in a single package, including all valves, sensors, pumps, piping, and other components. If desired, control wiring may be included, although instructions included with the kit may also specific the type of wiring required based on the particular installation.

Additionally, the electronic controller may be loaded with the necessary software or firmware required for use of the system. In alternative configurations, software may be included on various types of storage media (CDs, DVDs, USB drives, etc.) for upload to a standard PC, if the PC is to be used as the controller, or if the PC is used in conjunction with the pump system as a user or service interface. Additionally, website addresses and passwords may be included in the kit instructions for programs to be downloaded from a website on the internet.

The control algorithm technology described herein can be realized in hardware, software, or a combination of hardware and software. The technology described herein can be realized in a centralized fashion in one computer system or in a distributed fashion where different elements are spread across several interconnected computer systems. Any kind of computer system or other apparatus adapted for carrying out the methods described herein is suitable. A typical combination of hardware and software can be a general purpose computer system with a computer program that, when being loaded and executed, controls the computer system such that it carries out the methods described herein. Since the technology is contemplated to be used on a transit mixer, however, a stand-alone hardware system including the necessary operator interfaces (directional switch, speed selector, etc.) is desirable.

The technology described herein also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A pump system comprising:
 a closed-loop fluid circuit comprising:
  a motor for rotating a first component connected to the closed-loop fluid circuit;
  a closed-loop pump for driving the motor at a first maximum rotational speed; and
 an open-loop fluid circuit comprising an open-loop pump for driving a second component connected to the open-loop fluid circuit that provides an auxiliary function; and
 a control circuit comprising:
  a control valve for selectively connecting the open-loop pump to the closed-loop fluid circuit and for selectively disconnecting the open-loop pump from the closed-loop fluid circuit, wherein when the open-loop pump is connected to the closed-loop circuit, the closed-loop pump and the open-loop pump drive the motor at a second maximum rotational speed greater than the first maximum rotational speed; and
 a controller connected to each of the closed-loop pump, the open-loop pump, the motor, and the control valve, wherein the controller sends a control signal to actuate the control valve so as to connect the open-loop pump to the closed-loop fluid circuit when the controller receives a first component speed signal corresponding to a desired first component speed that is in excess of a first component speed produced when the closed-loop pump is at the first maximum rotational speed and wherein the auxiliary function of the open-loop fluid circuit is disabled when the open-loop pump is connected to the closed-loop fluid circuit.

2. The pump system of claim 1, wherein the closed-loop fluid circuit further comprises a control spool for controlling a direction of rotation of the closed-loop pump, such that when the control spool is in a first position, an output flow from the closed-loop pump is directed in a first direction through the closed-loop circuit.

3. The pump system of claim 2, wherein the control circuit further comprises a shuttle valve system for controlling an output flow from the open-loop pump, such that when the open-loop pump is connected to the closed-loop circuit and when the shuttle valve system is in a first position, the output flow from the open-loop pump is directed in the first direction through the closed-loop circuit.

4. The pump system of claim 1, further comprising a charge pump for filling the closed-loop fluid circuit with a hydraulic fluid.

5. The pump system of claim 4, further comprising a common motor for driving each of the open-loop pump, the closed-loop pump, and the charge pump.

6. The pump system of claim 3, wherein the shuttle valve system comprises a shuttle valve.

7. The pump system of claim 3, wherein the shuttle valve system comprises at least one of a plurality of hydraulic piloted valves and a plurality of electronic solenoid operated valves.

8. The pump system of claim 1, wherein each of the closed-loop pump and the open-loop pump comprise variable displacement pumps.

9. The pump system of claim 1, wherein the control valve comprises a manual valve.

10. A transit mixer comprising the pump system of claim 1, wherein the first component comprises a drum.

11. A method of controlling a pump system comprising a closed-loop fluid circuit comprising a closed-loop variable displacement pump, an open-loop fluid circuit comprising an open-loop variable displacement pump, a control valve, and a controller, the method comprising:
    adjusting an output flow of the closed-loop variable displacement pump based on a first desired speed signal received by the controller; and
    actuating the control valve so as to connect the open-loop variable displacement pump to the closed-loop fluid circuit based on a second desired speed signal received by the controller,
    wherein an auxiliary function of the open-loop fluid circuit is disabled when the open-loop variable displacement pump is connected to the closed-loop fluid circuit.

12. The method of claim 11, further comprising increasing an output flow of the open-loop variable speed pump based on a third speed signal received by the controller.

13. The method of claim 12, further comprising reducing the output flow of the open-loop variable displacement pump based on a fourth desired speed signal received by the controller.

14. The method of claim 11, further comprising changing an output flow direction from the closed-loop variable displacement pump based on a desired direction signal received by the controller.

15. The method of claim 14, further comprising changing a position of a shuttle valve at an outlet of the open-loop variable displacement pump based on the desired direction signal received by the controller.

16. The method of claim 11, further comprising charging the closed-loop fluid circuit with hydraulic fluid.

17. A pump system comprising:
    a closed-loop fluid circuit comprising:
        a motor for rotating a first component connected to the closed-loop fluid circuit; and
        a closed-loop pump for driving the motor at a first maximum rotational speed;
    an open-loop fluid circuit comprising an open-loop pump for driving a second component connected to the open-loop fluid circuit; and
    a control circuit comprising:
        a control valve for selectively connecting and disconnecting the open-loop pump with respect to the closed-loop fluid circuit, wherein when the open-loop pump is connected to the closed-loop circuit, the closed-loop pump and the open-loop pump are adapted to drive the motor at a second maximum rotational speed greater than the first maximum rotational speed;
        wherein the closed-loop fluid circuit further comprises a control spool for controlling a direction of rotation of the closed-loop pump, such that when the control spool is in a first position, an output flow from the closed-loop pump is directed in a first direction through the closed-loop circuit; and
        wherein the control circuit further comprises a shuttle valve system for controlling an output flow from the open-loop pump, such that when the open-loop pump is connected to the closed-loop circuit and when the shuttle valve system is in a first position, the output flow from the open-loop pump is directed in the first direction through the closed-loop circuit.

18. The pump system of claim 17, wherein when the control spool is in a second position, the output flow from the closed-loop pump is directed in a second direction through the closed-loop circuit, wherein when the open-loop pump is connected to the closed-loop circuit and when the shuttle valve system is in a second position, the output flow from the open-loop pump is directed in the second direction through the closed-loop circuit, and wherein the control spool and the shuttle valve system are coordinated so that the closed-loop pump and the open-loop pump direct flow in the same direction through the closed-loop circuit.

19. The pump system of claim 17, wherein the shuttle valve system comprises a shuttle valve.

20. The pump system of claim 17, wherein the shuttle valve system comprises at least one of a plurality of hydraulic piloted valves and a plurality of electronic solenoid operated valves.

* * * * *